United States Patent
Nigro et al.

(10) Patent No.: US 11,954,510 B2
(45) Date of Patent: Apr. 9, 2024

(54) NATIVE-IMAGE IN-MEMORY CACHE FOR CONTAINERIZED AHEAD-OF-TIME APPLICATIONS

(71) Applicant: Red Hat, Inc., Raleigh, NC (US)

(72) Inventors: Francesco Nigro, Milan (IT); Roderick Noel Kieley, St. John's (CA)

(73) Assignee: Red Hat, Inc., Raleigh, NC (US)

( * ) Notice: Subject to any disclaimer, the term of this patent is extended or adjusted under 35 U.S.C. 154(b) by 561 days.

(21) Appl. No.: 17/130,968

(22) Filed: Dec. 22, 2020

(65) Prior Publication Data

US 2022/0197682 A1 Jun. 23, 2022

(51) Int. Cl.
*G06F 9/455* (2018.01)
*G06F 9/445* (2018.01)
*G06F 9/54* (2006.01)

(52) U.S. Cl.
CPC ...... *G06F 9/45558* (2013.01); *G06F 9/44589* (2013.01); *G06F 9/544* (2013.01); *G06F 2009/45579* (2013.01)

(58) Field of Classification Search
CPC .. G06F 9/45558; G06F 9/44589; G06F 9/544; G06F 2009/45579; G06F 12/0842; G06F 12/084; G06F 12/0882; G06F 12/0888; G06F 2212/3042; G06F 9/455; G06F 8/44
See application file for complete search history.

(56) References Cited

U.S. PATENT DOCUMENTS

| | | | |
|---|---|---|---|
| 8,924,922 B2 | 12/2014 | Biswas et al. | |
| 9,519,466 B2 | 12/2016 | Delsart | |
| 11,188,354 B1* | 11/2021 | Yu | G06F 9/44563 |
| 2017/0083298 A1* | 3/2017 | Kotas | G06F 8/52 |
| 2018/0239707 A1* | 8/2018 | Tsirkin | G06F 12/0875 |
| 2021/0173622 A1* | 6/2021 | Craik | G06F 9/44521 |

OTHER PUBLICATIONS

Sipek et al., "Exploring Aspects of Polyglot High-Performance Virtual Machine GraalVM", May 2019, MIPRO, pp. 1671-1676. (Year: 2019).*
"Ngen.exe (Native Image Generator)," Microsoft, Mar. 30, 2017, https://docs.microsoft.com/en-us/dotnet/framework/tools/ngen-exe-native-image-generator.
"Oracle GraalVM Enterprise Edition 20 Guide, Oracle Corporation," https://docs.oracle.com/en/graalvm/enterprise/20/docs/security/security-guide/.
"Oracle GraalVM Enterprise Edition, Oracle Corporation," May 8, 2019, https://www.oracle.com/a/ocom/docs/tools/graalvm-ee-whitepaper.pdf.

(Continued)

*Primary Examiner* — Kenneth Tang
(74) *Attorney, Agent, or Firm* — Womble Bond Dickinson (US) LLP

(57) ABSTRACT

A method includes identifying an ahead-of-time (AOT) native-image application to be compiled and during AOT compilation of the AOT native-image application; bypassing an operating system page cache corresponding to the AOT native-image application; and accessing, by a processing device, the native-image application from an in-memory cache shared using inter-process-communication.

20 Claims, 5 Drawing Sheets

(56) References Cited

OTHER PUBLICATIONS

Faisal Masood, "Natively Compile Java Code for Better Startup Time," Red Hat Inc., Jul. 30, 2018, https://developers.redhat.com/blog/2018/07/30/natively-compile-java-code-for-better-startup-time/.

"Diagnostics Guide," IBM Corporation, Nov. 2009, https://www.ibm.com/support/knowledgecenter/SSYKE2/earlier_releases/5.0/diag50.pdf?view=kc.

Wimmer et al., Initialize Once, Start Fast: Application Initialization at Build Time, Proc. ACM Program Lang., Vo. 3, No. OOPSLA, Article 184, published Oct. 2019, 29 pages, located at http://www.christianwimmer.at/Publications/Wimmer19a/Wimmer19a.pdf..

* cited by examiner

NATIVE-IMAGE IN-MEMORY CACHE FOR CONTAINERIZED AHEAD-OF-TIME APPLICATIONS

TECHNICAL FIELD

Aspects of the present disclosure relate to in-memory cache and more specifically, to native-image in-memory cache for containerized ahead-of-time (AOT) applications.

BACKGROUND

In computing, ahead-of-time compilation (AOT compilation) is the act of compiling a higher-level programming language such as C or C++, or an intermediate representation such as Java® bytecode or .NET Framework Common Intermediate Language (CIL) code, into a native (system-dependent) machine code so that the resulting binary file can execute natively. AOT produces machine optimized code, just like a standard native compiler. One difference is that AOT transforms the bytecode of an extant virtual machine (VM) into machine code.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
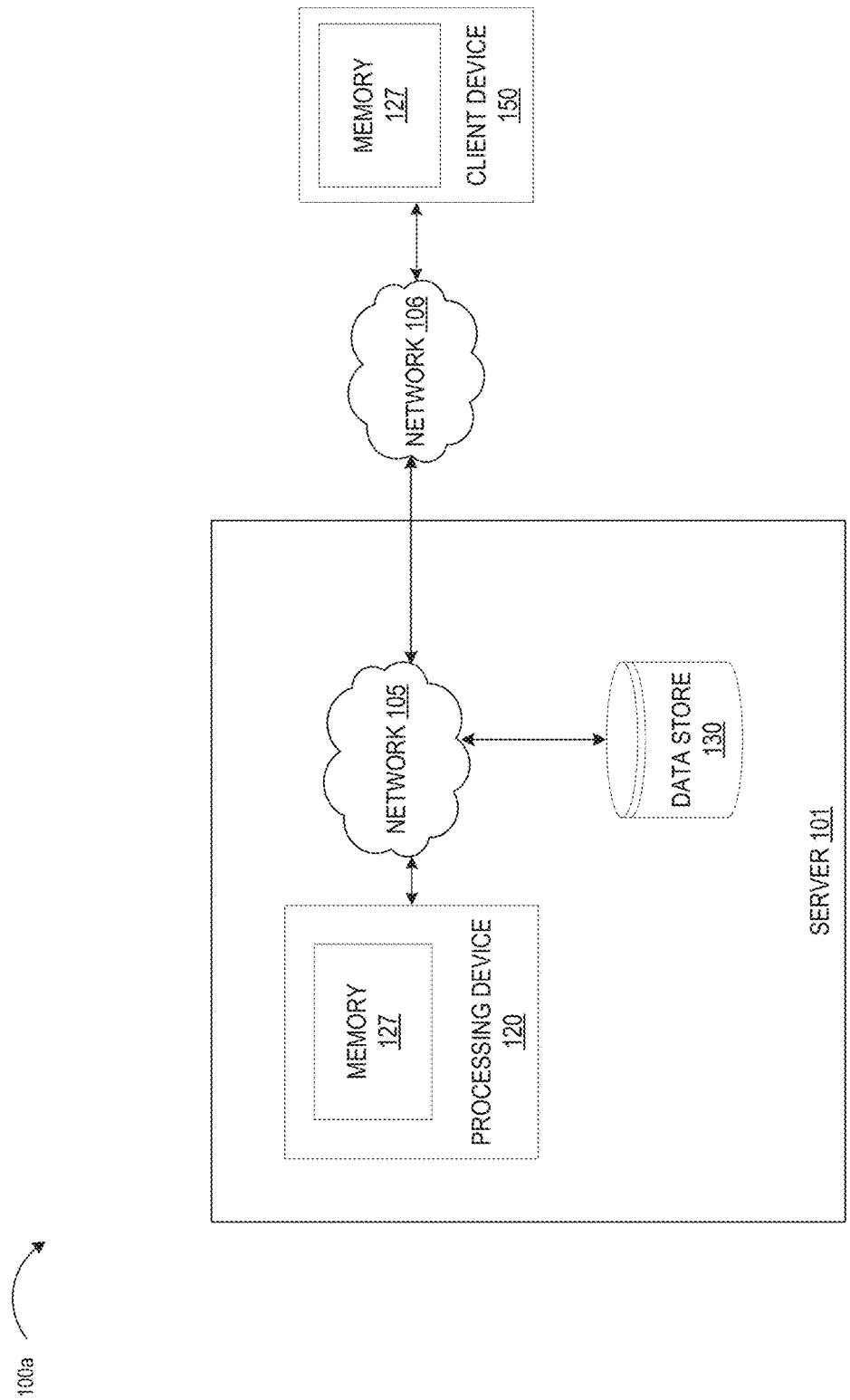
FIG. 1A is a block diagram that illustrates a first example system, in accordance with some embodiments of the present disclosure.

In one embodiment, native-image in-memory cache for containerized ahead-of-time (AOT) Java® applications is described herein. In one embodiment, AOT compilation may be the act of compiling a higher-level programming language such as C or C++, or an intermediate representation such as Java® bytecode or .NET Framework Common Intermediate Language (CIL) code, into a native (system-dependent) machine code so that the resulting binary file can execute natively. AOT produces machine optimized code, just like a standard native compiler. One difference is that AOT transforms the bytecode of an extant virtual machine (VM) into machine code.

As described herein, GraalVM (e.g., "Graal") is a Java® virtual machine (VM) and Java® Development Kit (JDK) based on HotSpot/OpenJDK, implemented in Java®. In one embodiment, Graal may support additional programming languages and execution modes, like ahead-of-time compilation of Java® applications for fast startup and low memory footprint.

In one embodiment, Java® applications compiled using a Graal AOT native image may produce an immutable serialized heap snapshot file that is shared (e.g., using copy-on-write memory mapping) by any process of the same executable in order to reduce the memory footprint. In one embodiment, a heap is, as it relates to the embodiments described herein, is a specialized tree-based data structure, which is essentially an almost complete tree that may satisfy the heap property: in a max heap, for any given node C, if P is a parent node of C, then the key (the value) of P is greater than or equal to the key of C. In a min heap, the key of P is less than or equal to the key of C. The node at the "top" of the heap (with no parents) may be called the root node. In one embodiment, the heap is one maximally efficient implementation of an abstract data type called a priority queue, and in fact, priority queues are often referred to as "heaps", regardless of how they may be implemented. In a heap, the highest (or lowest) priority element may be stored at the root.

Serialization may be the process of translating a data structure (e.g., a heap) or object state into a format that can be stored (for example, in a file or memory data buffer) or transmitted (for example, across a computer network) and reconstructed later (possibly in a different computer environment). When the resulting series of bits is reread according to the serialization format, it can be used to create a semantically identical clone of the original object.

Problematically, a serialized heap, while adopted in a containerized environment, may still need to perform some input/output (I/O) to memory map the serialized heap. In one embodiment, a memory map is a structure of data (which usually resides in memory itself) that indicates how memory is laid out. The term "memory map" can have different meanings in different contexts. For example, in virtual memory implementations and memory management units, a memory map may refer to page tables, which store the mapping between a certain process's virtual memory layout and how that space relates to physical memory addresses. In one embodiment, a serialized heap may need to be memory mapped to take full advantage of the memory being shared across multiple containers, such that each container is provided the location of the shared data without the need for redundant copies of the data. Such input and output to memory map the serialized heap, while efficient in limited contexts, utilizes unnecessary large amounts of resources and compute power in many cases.

For example, the above efficiency may only be realized, if multiple containers layout corresponding serialized heaps in exactly the same way. Otherwise, each containerized process may not necessary share the same mapping if the serialized file heap isn't an exact match across containerized processes. Disadvantageously, such inefficiencies waste both memory and disk resources depending on how many containerized processes are running and the size of such file.

The above problems may lead to subpar processing performance and wasted compute power and resources. When multiplied by the large number of such systems maintained by many of today's organizations, the problems described above are compounded and may lead to massive inefficiencies.

In response to the problems described above, and others, native-image in-memory cache for containerized ahead-of-time (AOT) Java® applications is described herein. For example, in one embodiment, by bypassing an operating system page cache corresponding to an AOT native-image application and, instead, accessing, a native-image application from an in-memory cache shared using inter-process-communication, containerized processes may bypass the serialized heap altogether, thus saving valuable system resources and compute power. Without the need to access the serialized heap, input/output is minimized as memory mapping may not need to be performed (or be performed less). Furthermore, unlike with a serialized heap, the embodiments described herein do not rely on an exact memory layout match for shared data to realized efficiency gains. Advantageously, the embodiments of the present disclosure overcome the above, another other, challenges by providing for efficient systems and methods for in-memory cache.

FIG. 1A is a block diagram that illustrates a first example system 100a, in accordance with some embodiments of the present disclosure. As discussed herein, memory 127 may include logic and/or applications (e.g., native-image AOT applications) that enable the operations and systems described herein, when executed. In one embodiment, memory 127 may be an in-cache memory, as described herein. In one embodiment, system 100a may be described as an apparatus, including logic and components for performing the operations described herein (e.g., server 101, network 106, client device 150, etc.). In one embodiment, memory 127 resides in whole or in part on a server (e.g., server 101) of system 100a. In another embodiment, memory 127 resides in whole or in part on a client device (e.g., client device 150) of system 100a. In yet another embodiment, memory 127 resides in whole or in part on any combination of the two, or in a different system entirely.

Server 101 may include various components, which may allow an application to be accesses and executed from memory 127 on a server device or client device. Each component may perform different functions, operations, actions, processes, methods, etc., for the embodiments described herein and/or may provide different services, functionalities, and/or resources for the embodiments described herein.

As illustrated in FIG. 1A, server 101 includes a memory 127, a computing processing device 120, a data store 130, and a network 105. The memory 127, the processing device 120, and the data store 130 may be coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a Wi-Fi hotspot connected with the network 105 and/or a wireless carrier system that can be implemented using various data processing equipment, communication towers (e.g. cell towers), etc.

The network 105 may carry communications (e.g., data, message, packets, frames, etc.) between the various components of server 101. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The server 101 may comprise any suitable type of computing device or machine that has a programmable processor including, for example, server computers, desktop computers, laptop computers, tablet computers, smartphones, set-top boxes, etc. In some examples, the server 101 may comprise a single machine or may include multiple interconnected machines (e.g., multiple servers configured in a cluster). The server 101 may be implemented by a common entity/organization or may be implemented by different entities/organizations. For example, a server 101 may be operated by a first company/corporation and a second server (not pictured) may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In one embodiment, server 101 is operably connected to client device 150 via a network 106. Network 106 may be a public network (e.g., the internet), a private network (e.g., a local area network (LAN) or wide area network (WAN)), or a combination thereof. In one embodiment, network 106 may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network 106 may carry communications (e.g., data, message, packets, frames, etc.) between the various components of system 101. Client device 150 may include memory 127, in addition to, or alternatively from, server 101. Further implementation details of the operations performed by system 101 are described with respect to FIGS. 1B-4.

Figure 1B:
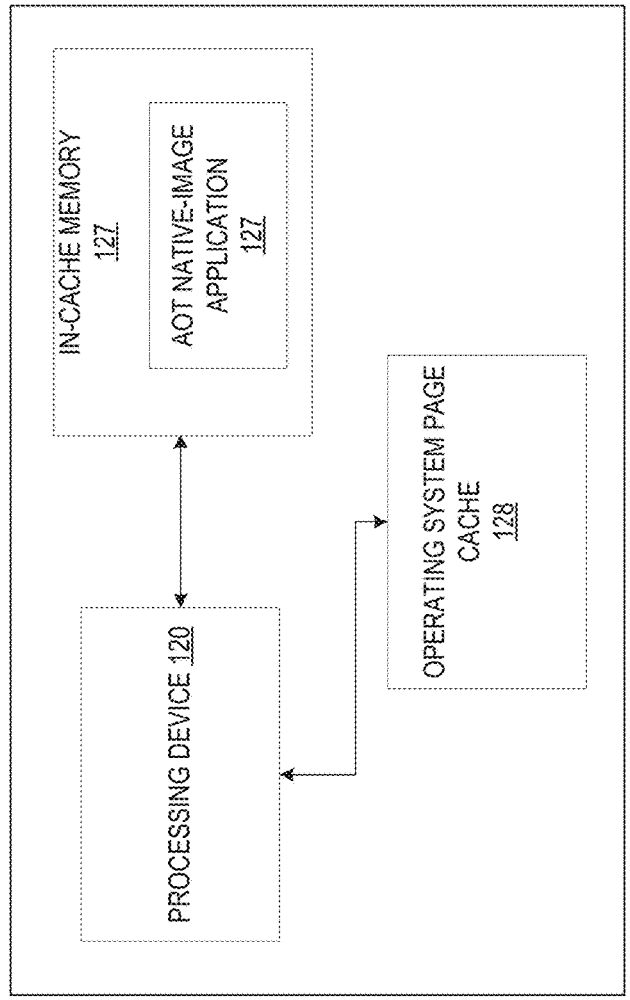
FIG. 1B is a block diagram that illustrates a second example system, in accordance with some embodiments of the present disclosure.

FIG. 1B is a block diagram that illustrates a second example system 100b, in accordance with some embodiments of the present disclosure. System 100b includes one or more components. As discussed herein, memory 127 may be an in-cache memory and include logic and/or application images (e.g., AOT native-image application 127) that enable the operations and systems described herein, when executed. In one embodiment, system 100b may be described as a containerized engine, including logic and components for performing the operations described. In one embodiment, memory 127 resides in whole or in part on a server (e.g., server 101) of system 100b. In another embodiment, memory 127 resides in whole or in part on a client device (e.g., client device 150 of FIG. 1) of system 100b. In yet another embodiment, memory 127 resides in whole or in part on any combination of the two, or in a different system entirely. System 100b may further include an operating system page cache 128, as shown.

System 100b may include various components, which may allow in-cache memory 127 to run on a server device or client device. Each component may perform different functions, operations, actions, processes, methods, etc., for the embodiments described herein and/or may provide different services, functionalities, and/or resources for the embodiments described herein.

As illustrated in FIG. 1B, system 100b includes an in-cache memory 127, a computing processing device 120, and an operating system page cache 128. The memory 127, the processing device 120, and the operating system page cache 128 may be coupled to each other (e.g., may be operatively coupled, communicatively coupled, may communicate data/messages with each other) via a network, bus, or the like. The network may be a public network (e.g., the internet), a private network (e.g., a local area network (LAN) or wide area network (WAN)), or a combination thereof. In one embodiment, the network may include a wired or a wireless infrastructure, which may be provided by one or more wireless communications systems, such as a Wi-Fi hotspot connected with the network and/or a wireless carrier system that can be implemented using various data processing equipment, communication towers (e.g. cell towers), etc.

The network may carry communications (e.g., data, message, packets, frames, etc.) between the various components of system 100b. Optionally, system 100b may include a data store, which may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs)), memory (e.g., random access memory (RAM)), storage devices (e.g., hard-disk drive (HDD), solid-state drive (SSD), etc.), and other hardware devices (e.g., sound card, video card, etc.). The system 100b may comprise any suitable type of computing device or machine that has a programmable processor including, for example, server computers, desktop computers, laptop computers, tablet computers, smartphones, set-top boxes, etc. In some examples, the system 100b may comprise a single machine or may include multiple interconnected machines (e.g., multiple servers configured in a cluster). The system 100b may be implemented by a common entity/organization or may be implemented by different entities/organizations. For example, a system 100b may be operated by a first company/corporation and a second server (not pictured) may be operated by a second company/corporation. Each server may execute or include an operating system (OS), or operating from a single OS in a containerized fashion, as discussed in more detail herein. The OS of a server may manage the execution of other components (e.g., software, applications, etc.) and/or may manage access to the hardware (e.g., processors, memory, storage devices etc.) of the computing device.

In one embodiment, system 100b is operably connected to a client device (e.g., 150 via a network 106 of FIG. 1a). The network may be a public network (e.g., the internet), a private network (e.g., a local area network (LAN) or wide area network (WAN)), or a combination thereof. In one embodiment, the network may include a wired or a wireless infrastructure, which may be provided by one or more wireless communications systems, such as a Wi-Fi hotspot connected with the network 106 and/or a wireless carrier system that can be implemented using various data processing equipment, communication towers (e.g. cell towers), etc. The network may carry communications (e.g., data, message, packets, frames, etc.) between the various components of system 100b. The client device may also include a memory, in addition to, or alternatively from, system 100b. Further implementation details of the operations performed by system 100b are described with respect to FIGS. 1A and 1C-4.

Figure 1C:
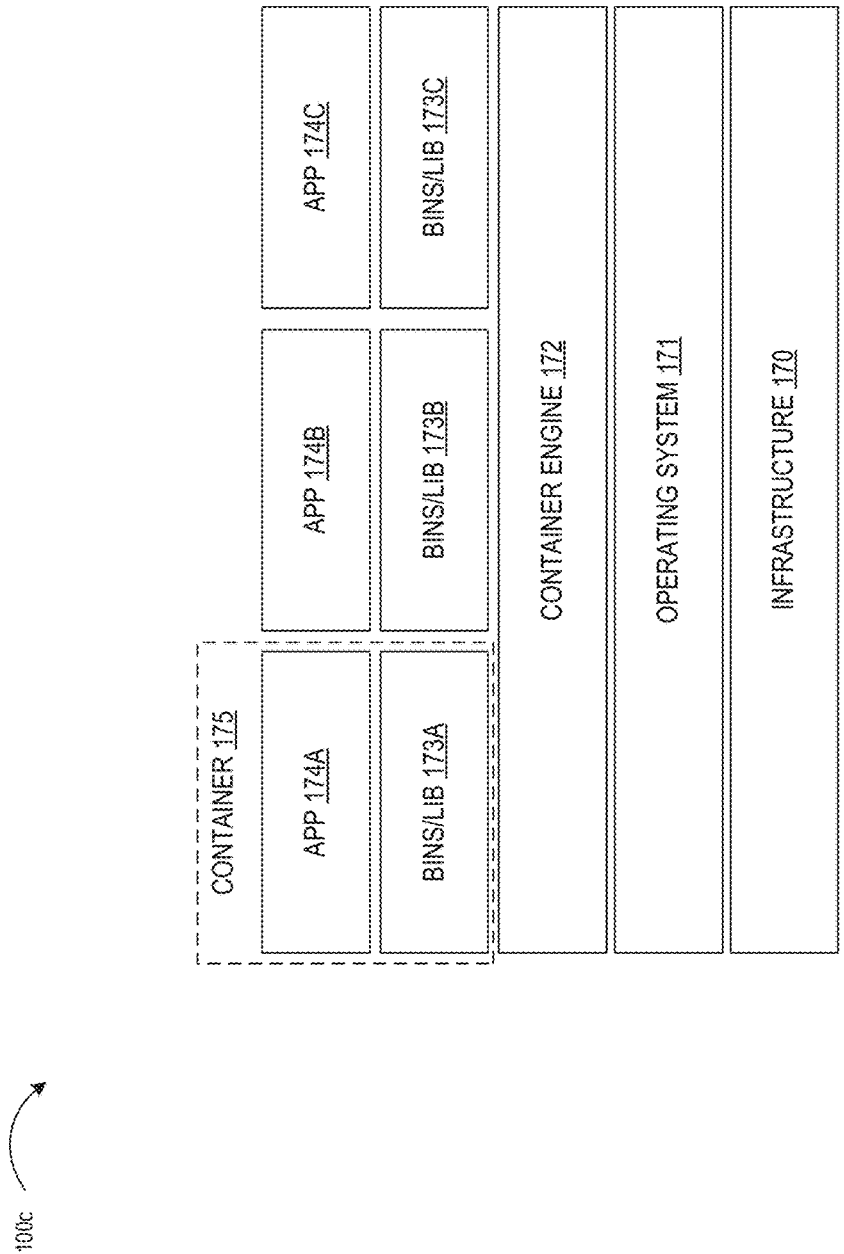
FIG. 1C is a block diagram that illustrates a third example system, in accordance with some embodiments of the present disclosure.

FIG. 1C is a block diagram that illustrates a third example system 100c, in accordance with some embodiments of the present disclosure. In one embodiment, system 100c includes a containerized infrastructure 170, an OS 171, a container engine 172, one or more binaries and/or libraries 173a-c, and one or more applications (e.g., AOT native-image applications) 174a-c residing in one or more containers (e.g., 175).

In one embodiment, each container (e.g., app and binary/library pair) 175 shares the host OS (171) kernel and, in some cases, the binaries and libraries, too. In one embodiment shared components are read-only (e.g., immutable). In one embodiment, infrastructure 170 may include some or all of the components of FIGS. 1A and/or 1B. In one embodiment, container engine 172 acts and an interface between individual containers and the underlying host OS (e.g., 171) kernel. As described herein, in certain contexts containers may bypass an underlying page cache of the OS 171 kernel space and instead access executables from an in-memory cache in the user space. Further implementation details of the operations performed by system 101 are described with respect to FIGS. 1A-B and 2-4.

Figure 2:
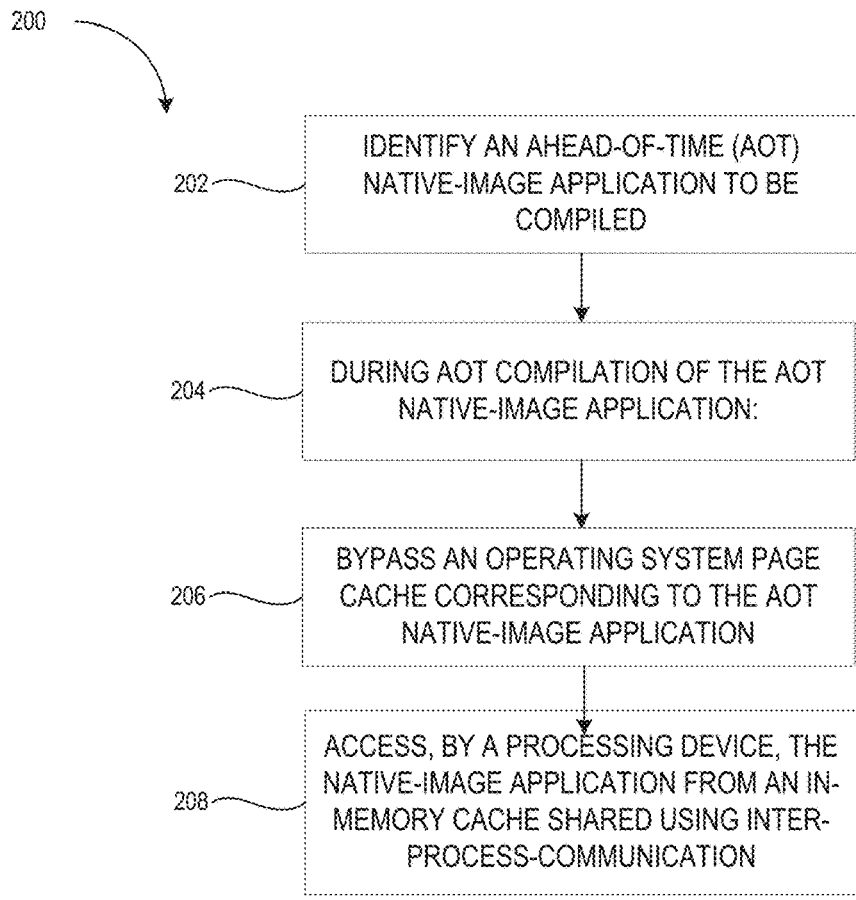
FIG. 2 is a flow diagram of a first method of native-image in-memory cache for containerized AOT applications, in accordance with some embodiments of the present disclosure.

FIG. 2 is a flow diagram of a first method of native-image in-memory cache for containerized AOT applications, in accordance with some embodiments of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-C may perform one or more of the following operations. For example, in one embodiment, processing logic of processing device 120 performs the following operations, with respect to the individual components of FIG. 1A-C. In another embodiment, any other suitable processing device may perform the described operations.

Referring to FIG. 2, at block 202, processing logic may identify an ahead-of-time (AOT) native-image application to be compiled. In one embodiment, during AOT compilation of the AOT native-image application (204), processing logic may perform a variety of actions. For example, in one embodiment, during compilation 204, processing logic at block 206 may bypass an operating system page cache corresponding to the AOT native-image application. On one embodiment, the operating system page cache would have normally been accessed during the compilation, and is instead bypassed by the processing logic described herein. In another embodiment, the page cache may still be accessed in part, but not to the full extent to which it would have been accessed without execution of the processing logic described herein. Advantageously, by bypassing the page cache altogether or accessing it less frequently, valuable input/output resources may be saved.

At block 208, processing logic may, during compilation, access (e.g., by a processing device), the native-image application from an in-memory cache shared using inter-process-communication (e.g., instead of or in addition to accessing the OS page cache). In one embodiment, the in-memory cache includes a tmpfs-backed file-system. In another embodiment, any other in-memory inter-processes communication (IPC) mechanism is contemplated. A variety of additional, optional features are contemplated with respect to systems and methods described herein.

For example, in one embodiment, the AOT native-image application is a containerized Java® application. In another embodiment, any other suitable application type is contemplated. In one embodiment, processing logic may determine that the AOT native-image application is one that is capable to produce an input/output (I/O) burst load exceeding a predetermined threshold.

In another embodiment, the AOT native-image application is a Graal AOT native image. In another embodiment, any other suitable AOT compiler is contemplated. In one embodiment, the Graal AOT native image (or any other AOT image) is to generate an immutable serialized heap snapshot file that is shared using copy-on-write memory mapping. In a further embodiment, the AOT native-image application may be indexed using an application identifier. In one non-limiting example, some combination of artifact, version, and/or serial identifiers of the application. Advantageously, this may be particularly beneficial while spawning many short running instances of the same application, saving latency outliers due to the file-backed memory mapping.

Advantageously, by bypassing an operating system page cache corresponding to an AOT native-image application and, instead, accessing, a native-image application from an in-memory cache shared using inter-process-communication, containerized processes may bypass the serialized heap altogether, thus saving valuable system resources and compute power. Without the need to access the serialized heap, input/output is minimized as memory mapping may not need to be performed (or be performed less). Furthermore, unlike with a serialized heap, the embodiments described herein do not rely on an exact memory layout match for shared data to realized efficiency gains.

Figure 3:
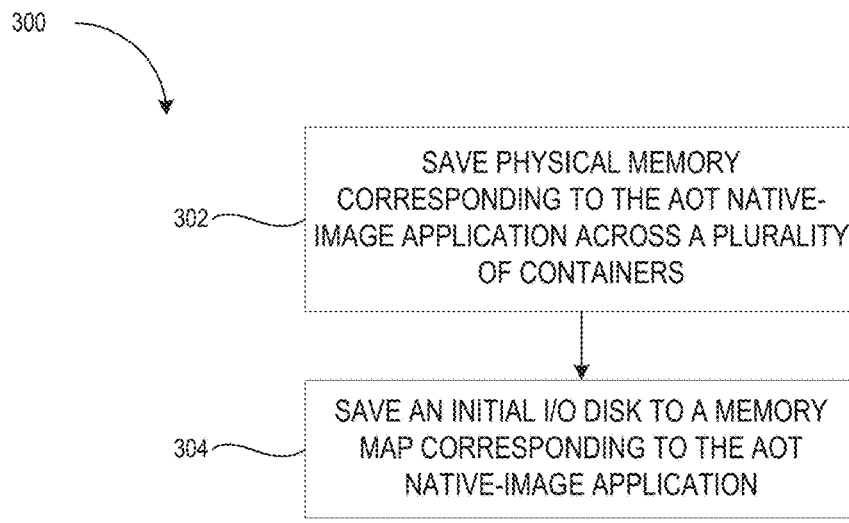
FIG. 3 is a flow diagram of a second method of native-image in-memory cache for containerized AOT applications, in accordance with some embodiments of the present disclosure.

FIG. 3 is a flow diagram of a second method of native-image in-memory cache for containerized AOT applications, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, processing logic corresponding to one or more components of FIG. 1A-C may perform one or more of the following operations. For example, in one embodiment, processing logic of processing device 120 performs the following operations, with respect to the individual components of FIG. 1A-C. In another embodiment, any other suitable processing device may perform the described operations.

Referring to FIG. 3, at block 302, processing logic may save physical memory corresponding to the AOT native-image application across a plurality of containers (302) and save an initial I/O disk to a memory map corresponding to the AOT native-image application (304).

Figure 4:
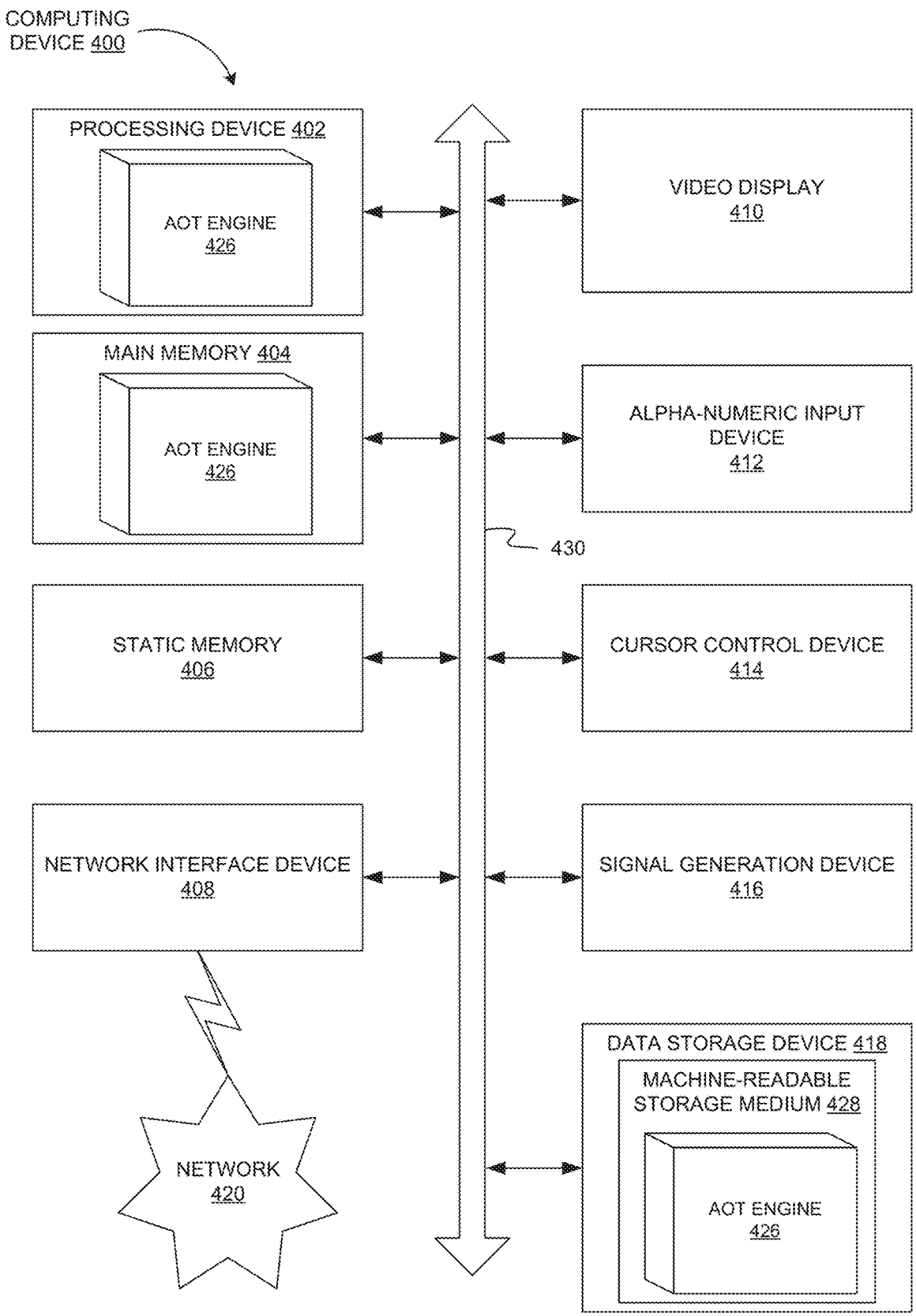
FIG. 4 is a block diagram of an example computing device that may perform one or more of the operations described herein, in accordance with some embodiments of the present disclosure.

FIG. 4 is a block diagram of an example computing device 400 that may perform one or more of the operations described herein, in accordance with some embodiments of the present disclosure. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein. In one embodiment, processing device 402 represents processing device 120 of FIG. 1A. In another embodiment, processing device 402 represents a processing device of a client device (e.g., client device 150 of FIG. 1A).

Computing device 400 may further include a network interface device 408 which may communicate with a network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions, e.g., instructions for carrying out the operations described herein, in accordance with one or more aspects of the present disclosure. Instructions implementing AOT engine 426 may also reside, completely or at least partially, within main memory 404 and/or within processing device 402 during execution thereof by computing device 400, main memory 404 and processing device 402 also constituting computer-readable media. The instructions may further be transmitted or received over a network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   identifying a containerized ahead-of-time (AOT) native-image application to be compiled; and
   during AOT compilation of the containerized AOT native-image application:
      bypassing an operating system page cache in kernel space, the operating system page cache corresponding to the containerized AOT native-image application; and
      accessing, by a processing device, the containerized AOT native-image application from an in-memory cache in user space, the in-memory cache shared using inter-process-communication.

2. The method of claim 1, wherein the containerized AOT native-image application is a containerized Java® application.

3. The method of claim 1, wherein the containerized AOT native-image application is a Graal AOT native image.

4. The method of claim 3, wherein the Graal AOT native image is to generate an immutable serialized heap snapshot file that is shared using copy-on-write memory mapping.

5. The method of claim 1, further comprising determining that the containerized AOT native-image application is capable to produce an input/output (I/O) burst load exceeding a predetermined threshold.

6. The method of claim 1, wherein the containerized AOT native-image application is indexed using an application identifier.

7. The method of claim 1, further comprising:
saving physical memory corresponding to the containerized AOT native-image application across a plurality of containers; and
saving an initial I/O disk to a memory map corresponding to the containerized AOT native-image application.

8. The method of claim 1, wherein the in-memory cache comprises a temporary file system-backed (tmpfs-backed) file-system.

9. A system, comprising:
an in-memory cache in user space, the in-memory cache to store containerized ahead-of-time (AOT) native-image application; and
a processing device operatively coupled to the in-memory cache, the processing device to:
identify the containerized AOT native-image application to be compiled; and
during AOT compilation of the containerized AOT native-image application:
bypass an operating system page cache in kernel space, the operating system page cache corresponding to the containerized AOT native-image application; and
access the containerized AOT native-image application from the in-memory cache shared using inter-process-communication.

10. The system of claim 9, wherein the containerized AOT native-image application is a containerized Java® application.

11. The system of claim 9, wherein the containerized AOT native-image application is a Graal AOT native image.

12. The system of claim 11, wherein the Graal AOT native image is to generate an immutable serialized heap snapshot file that is shared using copy-on-write memory mapping.

13. The system of claim 9, the processing device further to determine that the containerized AOT native-image application is capable to produce an input/output (I/O) burst load exceeding a predetermined threshold.

14. The system of claim 9, wherein the containerized AOT native-image application is indexed using an application identifier.

15. The system of claim 9, the processing device further to:
save physical memory corresponding to the containerized AOT native-image application across a plurality of containers; and
save an initial I/O disk to a memory map corresponding to the containerized AOT native-image application.

16. The system of claim 9, wherein the in-memory cache comprises a temporary file system-backed (tmpfs-backed) file-system.

17. A non-transitory computer-readable storage medium including instructions that, when executed by a processing device, cause the processing device to:
identify a containerized ahead-of-time AOT native-image application to be compiled; and
during AOT compilation of the containerized AOT native-image application:
bypass an operating system page cache in kernel space, the operating system page cache corresponding to the containerized AOT native-image application; and
access, by the processing device, the containerized AOT native-image application from an in-memory cache in user space, the in-memory cache shared using inter-process-communication.

18. The non-transitory computer-readable storage medium of claim 17, wherein the containerized AOT native-image application is a containerized Java® application.

19. The non-transitory computer-readable storage medium of claim 17, wherein the containerized AOT native-image application is a Graal AOT native image.

20. The non-transitory computer-readable storage medium of claim 19, wherein the Graal AOT native image is to generate an immutable serialized heap snapshot file that is shared using copy-on-write memory mapping.

* * * * *